A. M. CRISMAN.
VARIABLE CHANGE GEAR FOR PLANTERS.
APPLICATION FILED MAY 19, 1910.
995,226.
Patented June 13, 1911.
2 SHEETS—SHEET 1.
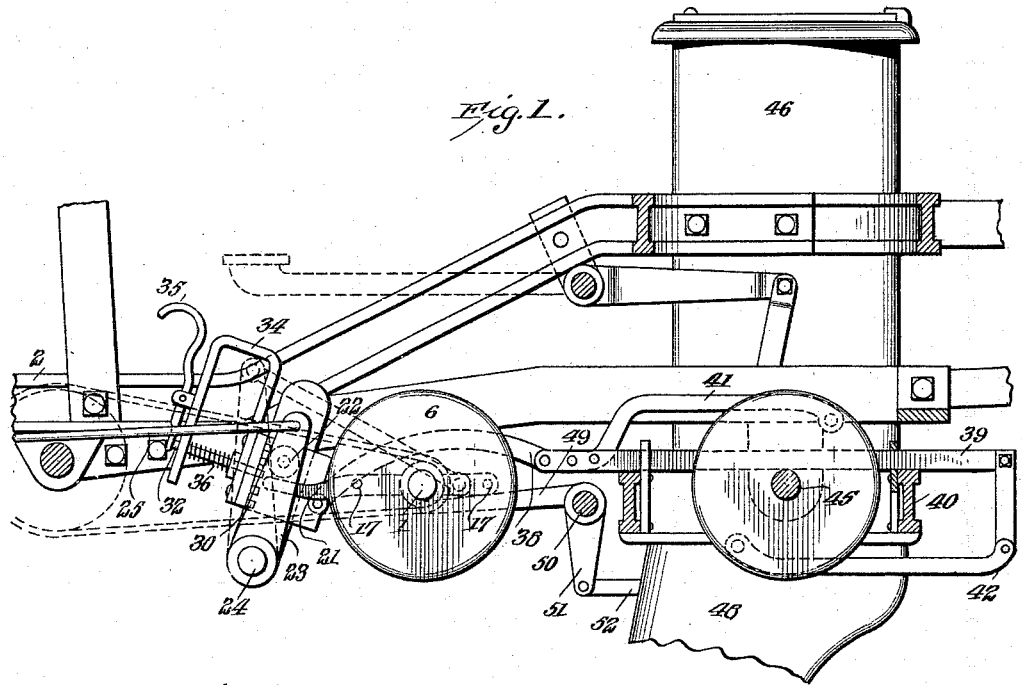
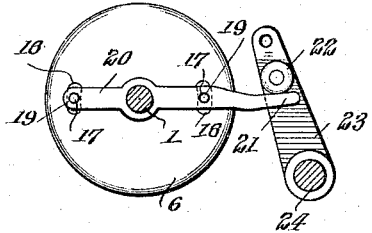
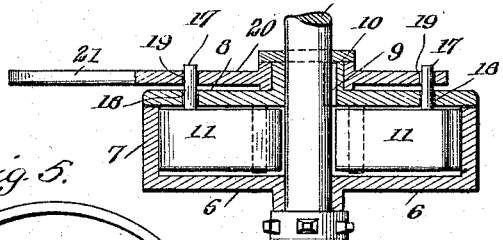
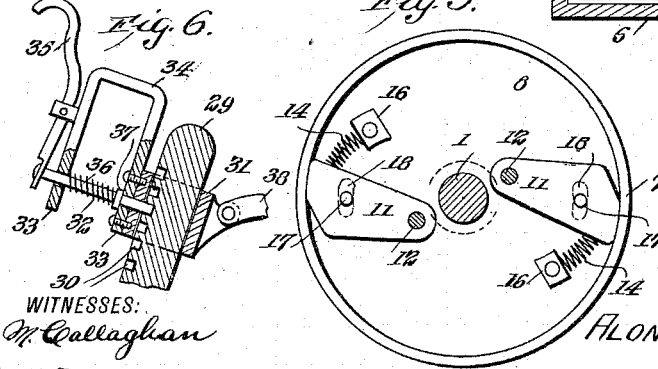
WITNESSES:
INVENTOR
ALONZO M. CRISMAN
BY
ATTORNEYS

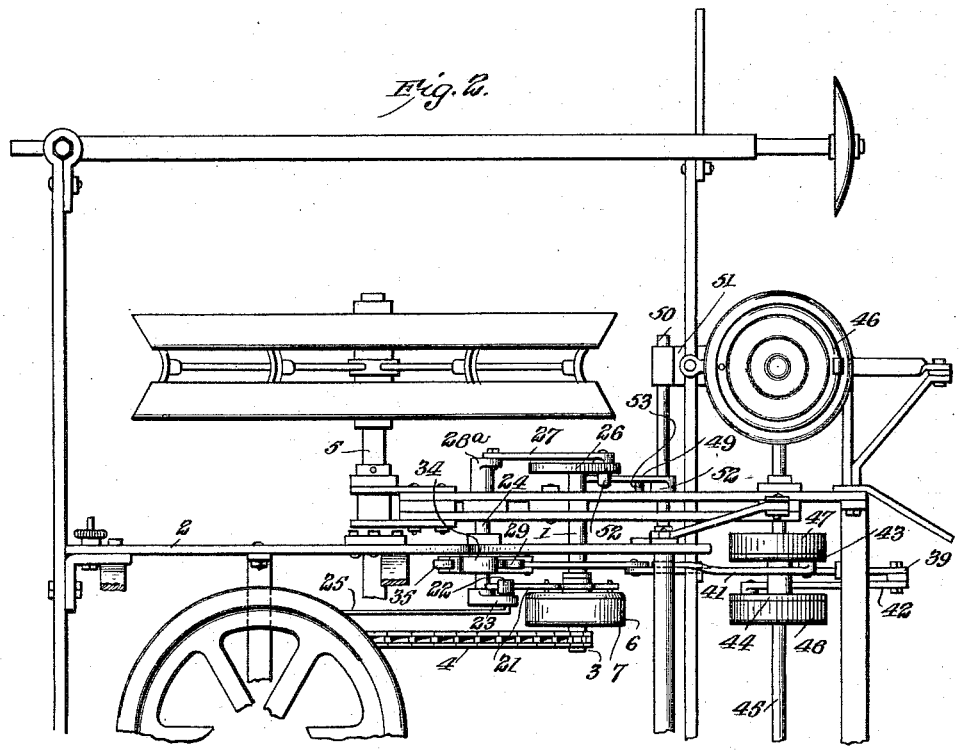

UNITED STATES PATENT OFFICE.

ALONZO M. CRISMAN, OF DAVENPORT, IOWA.

VARIABLE CHANGE-GEAR FOR PLANTERS.

995,226.  Specification of Letters Patent.  Patented June 13, 1911.

Application filed May 19, 1910. Serial No. 562,114.

*To all whom it may concern:*

Be it known that I, ALONZO M. CRISMAN, a citizen of the United States, and a resident of Davenport, in the county of Scott, State of Iowa, have invented certain new and useful Improvements in Variable Change-Gear for Planters, of which the following is a specification.

My invention is an improvement in variable change gear for planters, and consists in certain novel constructions and combinations of parts hereinafter described and claimed.

The object of the invention is to provide a device of the character specified whereby the movement of the seed dropping plates of a planter may be varied so that different amounts of seed may be planted in a hill without stopping the planter.
Referring to the drawings forming a part hereof: Figure 1 is a side view of a portion of a planter provided with the improvement; Fig. 2 is a plan view of Fig. 1; Fig. 3 is a transverse horizontal section of the clutch;
Fig. 4 is a side view of the same; Fig. 5 is a vertical section of the same; and Fig. 6 is a sectional view of the adjusting means for the connecting mechanism between the seed plate operating means and the operating means.

In dropping grain the conditions of the soil often make it desirable that different quantities of seed be deposited in different portions of the field. As, for instance, on a hillside where the soil has been washed away only a light crop may be grown, while in the valley a heavier growth will be taken care of.

To permit the quantity of grain deposited to be varied at the will of the operator, a shaft 1 is journaled on the frame 2 of the planter and is provided at one end with a sprocket wheel 3 connected by a chain 4 with the axle 5 of the planter, and the shaft 1 is driven by the said axle. A disk 6 forming the movable part of a clutch and provided with an overhanging marginal flange 7 is journaled loosely on the shaft 1 together with the sprocket wheel, and a second disk 8 forming the fixed part is keyed to the shaft by a key 9, and the second disk is provided with an annularly grooved hub 10. A pair of oppositely arranged dogs or pawls 11 is pivoted to the inner face of the disk 8 by pins 12, and the free end of each pawl, which is preferably provided with a layer of wood or fiber, is normally pressed into engagement with the inner face of the flange 7 by a spring 14 arranged between the pawl and a block 16 on the disk. Each pawl is provided with a laterally extending pin 17 which passes through a slot 18 in the disk 8 and engages loosely an opening 19 in a lever 20 journaled in the groove of the hub 10. One of the ends of the lever is extended, as at 21, into position for engagement by a roller 22 on a crank arm 23 journaled on the end of a shaft 24 journaled on the frame, and the outer end of the crank arm is engaged by the tripping link 25, the said link being operated at specified intervals by the measuring wheel or caliper shown in my copending application, Serial No. 562,113 filed May 19, 1910. A disk 26 is secured to the opposite end of the shaft 1, and a link 27 connects a wrist pin 28 on the disk with a crank arm 28$^a$ on the opposite end of the shaft 24. Adjacent to the arm 23 the shaft is provided with another arm 29 having in one face thereof a series 30 of openings. A sleeve 31 is slidable on the arm, and is held in adjusted position by means of a pin 32 passing through alined openings in the arms 33 of a stirrup 34 and engaging one of the series of openings. One arm of the stirrup is connected with the sleeve and the pin is operated by means of a lever 35 pivoted to the other arm of the stirrup and having one end connected with the pin, and the pin is normally pressed into engagement with the openings by a spring 36 encircling the pin between the outer arm of the yoke and a collar 37 on the pin.

The sleeve 31 is pivotally connected by a link 38 with a sliding frame 39 movable on guides 40 on the frame. A pair of connecting rods 41 and 42 connect opposite corners of the sliding frame with disks 43 and 44 on a shaft 45, each disk being the loose member of the clutch shown and described in my prior Patent No. 866,339, dated September 17, 1907.

The shaft 45 operates the seed plates shown and described in my co-pending application Serial No. 562,115, filed May 19, 1910 which are supported in the seed containers or boxes 46 on the frame. The connecting rods 41 and 42 are connected with the clutch members at diametrically opposite points, as shown, and when moved in one direction the disks clutch the fixed members 47 and 48 of the clutch which are keyed to the shaft 45. The arrangement of the clutch is such that as the sliding frame is reciprocated in either direction one clutch is connected so that the shaft 45 is rotated at each movement of the sliding frame.

The operation of the above described mechanism is as follows. The pawls 11 are normally pressed into engagement with the flange 7 of the disk, so that the said disk rotates with the shaft 1. When, however, the end 21 of the lever 20 engages the roller 22 on the tripping arm 23 the pawls are pressed inwardly against the resistance of the springs 14 and the disk 6 is released from the shaft 1. The movement of the tripping arm takes place at regular intervals through the measuring wheel, and by means of the disk 26, link 27 and crank arm 28ᵃ the shaft 24 is oscillated. The oscillation of the said shaft is imparted to the sliding frame by means of the arm 29, sleeve 31 and link 38, and the said frame operates the driving shaft 45 to cause the seed plates to rotate. The said plates are provided with a plurality of seed cells, each containing a specified number of seeds, as, for instance, one grain, and as the said plates rotate the cells are moved past the delivery point of the container. By moving the sleeve 31 toward or from the shaft 24 the speed of the movement of the sliding frame may be varied to cause a greater or less number of cells to pass the delivery point in a specified time. If, for instance, the sleeve is in such position on the arm 29 that two cells will move by the point of delivery between trips, two seeds will be dropped in a hill. Then to obtain a greater number of seeds to the hill the sleeve is moved outwardly, and to obtain a less number the sleeve is moved inwardly. The openings are so arranged that when the pin is engaged with alternate openings two, three and four grains will be deposited in a hill, and when engaged with intermediate openings the planter will alternately deposit one and two, two and three, and three and four grains to the hill. If, for instance, it is found that with the openings two inches apart one, two, three and four seeds will be deposited, an opening between any of the other two will cause the alternate deposit when the pin is engaged with such opening. It will be understood that the seeds or grains deposited by the cells are held until a specified quantity accummulates, as, for instance, three or four, after which the valve is opened, permitting the quantity collected to pass into the runner or furrow opener 48. The valves which are of usual construction, and hence not shown, are operated by an arm 49 secured to a shaft 50 journaled on the frame, and the shaft is provided with arms 51 connected by links 55 with the valves for operating the same. A roller 52 is secured to the inner face of the disk 26 and engages the arm 49 once during each rotation of the disk. The arm 49 is normally held in position for engagement with the roller by a spring 53, which returns it to its original position when it has been moved by the roller. When the clutch disks 6 and 8 are disengaged in the manner first described, the roller 52 is almost in contact with the arm, and when the clutch parts again engage the roller swings the arm 49 downwardly, opening the valves and depositing the collected quantity of seeds. During the opening of the valves the seed plates are stationary because the wrist pin on the disk 26 is passing the dead center and there is for a moment no movement of the shaft 45.

In operation, the roller 22 is normally in the path of and in contact with the end 21 of the lever 20. At regular intervals, the tripping device operates to swing the said roller out of contact with the lever, permitting the clutch to engage the lever with the shaft 1. When this occurs, the shaft and clutch begin to rotate and before the rotation is complete, the tripping rod 25 returns the arm 23 and the roller 22 to their normal positions in the path of the end 21 of the lever. As soon as the said end engages the roller, the clutch is released from the shaft 1 and remains in this position until the tripping again occurs.

During each complete rotation of the shaft 1 the seed plates deposit a specified number of seed, depending upon the position of the sleeve 31. If, for instance, the sleeve is in its innermost position, the plates will deposit two seeds or grains during each rotation of the shaft. If now the sleeve is moved to its outermost position, the speed of the plates is increased and it will be evident that a greater number of seed will be deposited.

The arm 49, it will be noticed, is arranged (Figs. 1 and 2) to be engaged by the roller 52 as it is passing the dead center of the shaft, so that the valves may open and close while the seed plates are inactive, and the opening of the valves follows the stopping of the plates, and the deposit of the seed in the valves and their deposit in the ground is consecutive and not synchronous.

I claim:

1. In a planter, a shaft for driving the seed plates, a sliding frame, a plurality of clutches for connecting the frame with the shaft to rotate said shaft in one direction when the frame reciprocates, a driving shaft, a disk secured thereto, a disk journaled thereon, a plurality of pawls on the last named disk normally clutching said disks together, a driving connection between the loose disk and the axle, a pin extending laterally from each pawl, a lever journaled on the driving shaft and having an opening for each pin, a disk fixed to the shaft, a counter shaft, a driving connection between the counter shaft and the fixed disk of the driving shaft, an arm on the counter shaft, a sleeve adjustable longitudinally thereof, a connection between the sleeve and the sliding frame, a tripping arm, a roller on said arm normally in engagement with the end of the lever for restraining the operation of the pawls, a valve opening shaft, an arm thereon, and a roller on the fixed disk for engaging the arm to operate the shaft, said arm being arranged for engagement by the roller as it passes the dead center of the driving shaft.

2. In a planter, a shaft for operating the seed plates, a shaft for opening the valves, means for operating the seed plate shaft to cause the plates to deposit a specified number of seed on the valves prior to the opening thereof, said means comprising a reciprocating frame, means whereby the reciprocation of the frame will rotate the seed plate shaft in one direction, a shaft having a radial arm, a sleeve connected with the frame and adjustable on the arm, a driving shaft, a disk fixed thereon, a driving connection between the shaft having the radial arm and the disk, a sprocket wheel journaled on the driving shaft, a connection between the wheel and the axle, a disk rigid with said sprocket, a disk keyed to the shaft, spring pressed pawls on the keyed disk normally engaging the disk on the sprocket, a lever connected with the pawls, a tripping arm, a roller on the arm normally in engagement with the lever to restrain the operation of the pawls, an arm on the valve opening shaft, and a roller on the first named disk for engaging the same, said arm being in position for engagement by the roller as it passes the dead center of the driving shaft.

3. In a planter, a shaft for operating the seed plates, a shaft for opening the valves, means for operating the seed plate shaft to cause the plates to deposit a specified number of seed on the valves prior to the opening thereof, said means comprising a reciprocating frame, means whereby the reciprocation of the frame will rotate the seed plate shaft in one direction, a shaft having a radial arm, a sleeve connected with the frame and adjustable on the arm, a driving shaft, a disk fixed thereon, a driving connection between the shaft having the radial arm and the disk, a sprocket wheel journaled on the driving shaft, a connection between the wheel and the axle, a disk rigid with said sprocket, a disk keyed to the shaft, spring pressed pawls on the keyed disk normally engaging the disk, means acting normally to restrain the operation of the pawls, a tripping on the sprocket arm for releasing said means at predetermined intervals to permit the pawls to connect the keyed disk and the loose disk, an arm on the valve opening shaft, and a roller on the first named disk for engaging the arm, said arm being in position for engagement by the roller as it passes the dead center.

4. In a planter, a shaft for operating the seed plates, a shaft for opening the valves, means for operating the seed plate shaft to cause the plates to deposit a specified number of seed on the valves prior to the opening thereof, said means comprising a reciprocating frame, means whereby the reciprocation of the frame will rotate the seed plate shaft in one direction, a shaft having a radial arm, a sleeve connected with the frame and adjustable on the arm, a driving shaft, a disk fixed thereon, a driving connection between the shaft having the radial arm and the disk, a sprocket wheel journaled on the driving shaft, a connection between the wheel and the axle, a disk rigid with said sprocket, a disk keyed to the shaft, spring pressed pawls on the keyed disk acting normally to connect the keyed and the loose disks, a tripping arm for disengaging the pawls from the disk on the sprocket at predetermined intervals, an arm for operating the valve opening shaft, and a roller on the first named disk for moving the arm as the roller passes the dead center of the driving shaft.

5. In a planter, a shaft for operating the seed plates, a shaft for opening the valves, means for operating the seed plate shaft to cause the plates to deposit a specified number of seed on the valves prior to the opening thereof, said means comprising a reciprocating frame, means whereby the reciprocation of the frame will rotate the seed plate shaft in one direction, a shaft having a radial arm, a sleeve connected with the frame and adjustable on the arm, a driving shaft, a disk fixed thereon, a driving connection between the shaft having the radial arm and the disk, a sprocket wheel journaled on the driving shaft, a connection between the wheel and the axle, a disk rigid with said sprocket, a disk keyed to the shaft, spring pressed pawls on the keyed disk normally engaging the disk on the sprocket, a tripping device for disengaging the pawls from the loose disk at predetermined intervals, a roller on the first named disk, and means operated by the roller as it passes the dead center of the shaft for operating the valve opening shaft.

6. In a planter, a shaft for operating the seed plates, a shaft for opening the valves, means for operating the seed plate shaft to cause the plates to deposit a specified number of seed on the valves prior to the opening thereof, said means comprising a reciprocating frame, means whereby the reciprocation of the frame will rotate the seed plate shaft in one direction, a shaft having a radial arm, a sleeve connected with the frame and adjustable on the arm, a driving shaft, a driving connection between the shaft having the radial arm and the driving shaft, a driving connection between the driving shaft and the axle, a tripping device for releasing the said connection at predetermined intervals, a disk on the driving shaft, a roller on the disk, and an arm on the valve opening shaft and in position for engagement by the roller as it passes the dead center of the driving shaft.

7. In a planter, a shaft for operating the seed plates, a shaft for opening the valves, means for operating the seed plate shaft to cause the plates to deposit a specified number of seed on the valves prior to the opening thereof, said means comprising a reciprocating frame, means whereby the reciprocation of the frame will rotate the seed plate shaft in one direction, a shaft having a radial arm, a sleeve connected with the frame and adjustable on the arm, a driving shaft, a driving connection between the shaft having the radial arm and the driving shaft, a driving connection between the driving shaft and the axle of the planter, a tripping device for releasing the said connection at predetermined intervals, and means operated by the driving shaft for operating the valve opening shaft when said connection is active.

8. In a planter, a shaft for operating the seed plates, a reciprocating frame, a connection between the frame and the shaft for rotating said shaft in one direction when the frame is reciprocated, a shaft having a radial arm, a sleeve adjustable on the arm and connected to the frame, a driving shaft, a driving connection between the said shaft and the axle, a tripping mechanism for releasing the said connection at predetermined intervals, a driving connection between the driving shaft and the shaft with the radial arm, a disk on the driving shaft, a roller on the disk, and means for opening the valves of the planter operated by the roller when it passes the dead center of the driving shaft.

9. In a planter, a shaft for operating the seed plates, a reciprocating frame, a connection between the frame and the shaft for rotating said shaft in one direction when the frame is reciprocated, a shaft having a radial arm, a sleeve adjustable on the arm and connected to the frame, a driving shaft, a driving connection between the said shaft and the axle, a tripping mechanism for releasing the said connection at predetermined intervals, a driving connection between the driving shaft and the shaft with the radial arm, means for opening the valves of the planter, and means on the driving shaft for operating the said means when the driving shaft first begins to rotate.

10. In a planter, a shaft for operating the seed plates, a reciprocating frame, a connection between the frame and the shaft for rotating said shaft in one direction when the frame is reciprocated, a shaft having a radial arm, a sleeve adjustable on the arm and connected to the frame, a normally operative driving connection between the said shaft and the axle of the planter, a tripping mechanism for releasing the said connection at predetermined intervals, a valve operating shaft and means operated before the commencement of movement of the said arm carrying shaft for actuating said valve operating shaft.

11. In a planter, means for rotating the seed plates, a driving connection between the said means and the axle of the planter, a tripping device for releasing the said connection at predetermined intervals, means for varying the relative speed of the seed plates and the axle, means for opening the valves of the planter, and means operated by the axle for actuating said means prior to the commencement of movement of the seed plates.

12. In a planter, means for operating the seed plates, means for opening the valves, a common driving means for both of said means, a connection between the axle of the planter and the said driving means for operating the same, means for varying the relative speed of the seed plate operating means and the driving means, and means for causing the said common driving means to operate the seed plate operating means and the valve opening means in succession.

ALONZO M. CRISMAN.

Witnesses:
  JOSEPH J. BRUS,
  THOMAS SIEVERS.

---

Copies of this patent may be obtained for five cents each, by addressing the "Commissioner of Patents, Washington, D. C."